(No Model.)
W. C. FULLER & T. R. CAPWELL.
SANDPAPERING MACHINE.
No. 533,707. Patented Feb. 5, 1895.
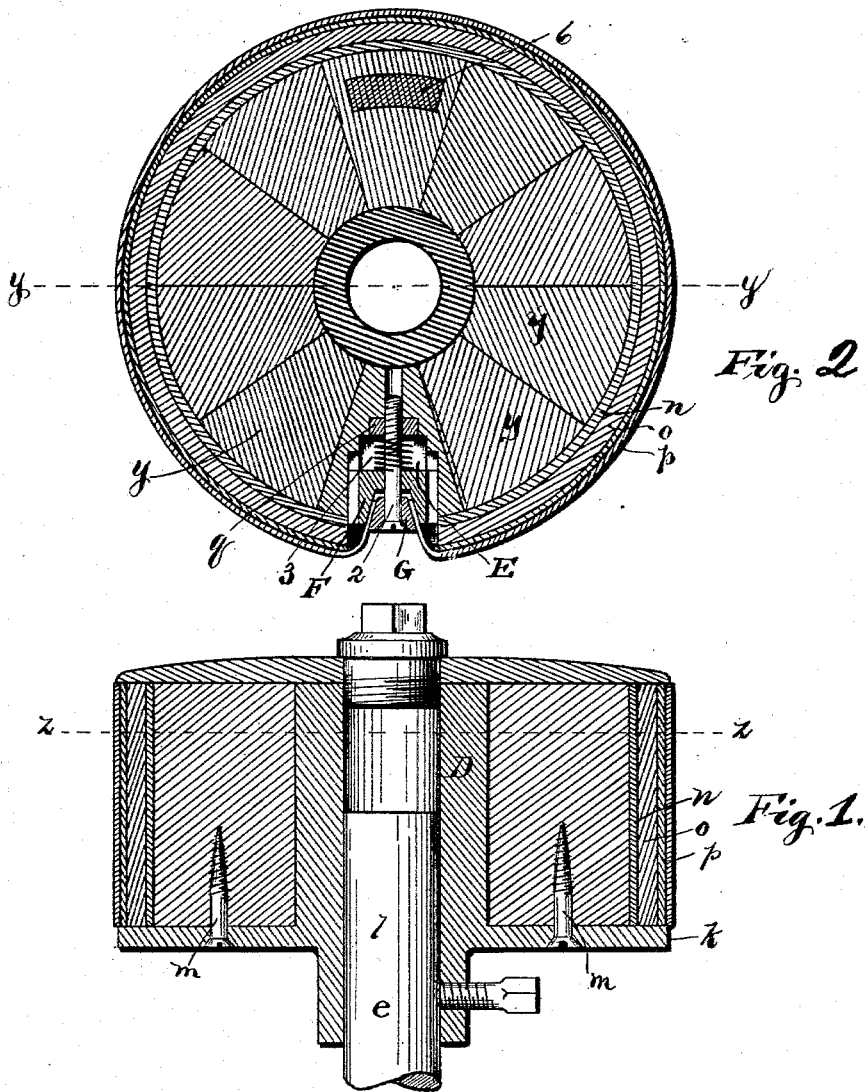
WITNESSES:
H. A. Carhart,
F. May Goodrich.
INVENTORS
William C. Fuller &
Thomas R. Capwell.
By Smith & Denison
ATTORNEYS.

UNITED STATES PATENT OFFICE.

WILLIAM C. FULLER AND THOMAS R. CAPWELL, OF DUNKIRK, NEW YORK.

SANDPAPERING-MACHINE.

SPECIFICATION forming part of Letters Patent No. 533,707, dated February 5, 1895.

Application filed June 28, 1893. Serial No. 479,074. (No model.)

*To all whom it may concern:*

Be it known that we, WILLIAM C. FULLER and THOMAS R. CAPWELL, of Dunkirk, in the county of Chautauqua, in the State of New York, have invented new and useful Improvements in Sandpapering-Machines, of which the following, taken in connection with the accompanying drawings, is a full, clear, and exact description.

This invention relates to certain new and useful improvements in sand papering heads, and consists of a sand-papering head upon which the sand-paper may be readily and easily replaced; and to that end our invention consists in the several new and novel features of construction and operation hereinafter described and which are specifically set forth in the claim hereunto annexed.

It is constructed as follows, reference being had to the accompanying drawings, in which—

Figure 1, is a vertical section of the sand-papering head on line $y\,y$, Fig. 2. Fig. 2, is a cross section on line $z\,z$, Fig. 1.

The sand-papering head —B— comprises the bracket —D—, having the annular base —$k$— and provided with suitable means for adjusting it vertically upon the shaft —$e$—. The head proper, is constructed of keystone shaped pieces —$y$—, resting upon the base —$k$— having their inner ends abutting against the outer walls of the bracket —D— and are held in position by screws —$m$—. In the edge of the head is a transverse recess —E— having parallel walls and in the inner end of said recess one or more threaded nuts —$q$— are secured. F is a block inserted into said recess and provided with guide ribs —$r$— which fit freely in grooves in the walls thereof and is adjustably secured therein by means of the screws or bolts —2— inserted through the holes —$s$— and engaging with said nuts and —3—3— are springs around said screws between said block and said nuts which are compressed by the operation of said screws to draw said block in, said block being forced outward by them, when said screws are loosened, to effect the ready removal of the same. A padding is secured into the face of said head, consisting of a layer of rubber —$n$—, a layer of felt —$o$— and an outer layer of canvas —$p$—. In the outer face of said block a groove —1— is cut, having inwardly converging walls and —G— is a filler, or grip, having its opposite sides beveled to fit into said groove and said screws —2— pass through it and retain it in position.

To secure the sand-paper upon the head, we loosen the screws —2— until the filler —G— may be freely removed from the block. We then place one end of the sand-paper between the filler and the block, drawing the sand-paper tightly around the periphery of the head until its opposite end may be inserted between said filler and the block, when the screws are again tightened until the filler has drawn the sand-paper tightly about the head.

6, is a piece of metal inserted in the opposite side of the sand-papering head to counterbalance the weight caused by the block —F—.

What we claim as our invention, and desire to secure by Letters Patent, is—

A sand papering head comprising a cylindrical body having a rectangular recess transverse to its periphery, the block fitting in said recess and having lateral ribs engaging guide grooves in the walls of said recess, a bevel edged grip or filler fitting in a correspondingly shaped seat or recess in said block, screws having their unthreaded portions passing through apertures in said block and grip or filler and having their threaded portions engaging nuts held in the bottom of said recess, and springs arranged on said screws and pressing against said block, substantially as set forth.

In witness whereof we have hereunto set our hands this 24th day of June, 1893.

W. C. FULLER.
  THOMAS R. CAPWELL.

In presence of—
 LESTER F. STEARNS,
 ELTON D. WARNER.